United States Patent
Walters

[11] Patent Number: 6,164,313
[45] Date of Patent: Dec. 26, 2000

[54] LOW-HIGH FLOW RATE VALVE

[76] Inventor: William R. Walters, P.O. Box 594, Cleveland, Okla. 74020

[21] Appl. No.: 09/201,365

[22] Filed: Nov. 30, 1998

[51] Int. Cl.[7] ........................... F16K 24/02; F16K 31/34; F16K 31/365

[52] U.S. Cl. .......................... 137/218; 137/414; 137/437; 137/451; 137/625.3; 137/625.33; 251/46; 251/205

[58] Field of Search ........................ 137/218, 414, 137/436, 443, 444, 413, 437, 451, 625.3, 625.38, 625.33; 251/28, 45, 46, 61.1, 61.2, 118, 120, 121, 122, 205, 210, 331, 4, 5

[56] References Cited

U.S. PATENT DOCUMENTS

| | | | |
|---|---|---|---|
| 19,203 | 1/1858 | Osgood | 137/625.3 |
| 212,556 | 2/1879 | Johnson | 137/625.3 |
| 1,248,650 | 12/1917 | Gustafson | 137/414 |
| 2,228,552 | 1/1941 | Arbogast | 137/414 |
| 2,280,615 | 4/1942 | Baldwin | 251/45 |
| 2,283,973 | 5/1942 | Criss | 137/218 |
| 2,573,369 | 10/1951 | Snoddy | 137/139 |
| 2,677,387 | 5/1954 | Crawford | 137/625.3 |
| 2,774,379 | 12/1956 | Sweeney, Jr. | 137/414 |
| 2,791,235 | 5/1957 | Smith | 137/444 |
| 2,875,778 | 3/1959 | Hair | 137/414 |
| 2,880,752 | 4/1959 | Kreuttner | 137/625.3 |
| 2,971,525 | 2/1961 | Antunez, Jr. | 137/217 |
| 2,976,887 | 3/1961 | Wilson | 251/331 |
| 2,986,155 | 5/1961 | Doyle | 137/218 |
| 3,100,083 | 8/1963 | Wardrup | 239/452 |
| 3,145,728 | 8/1964 | Sterrett et al. | 137/414 |
| 3,158,173 | 11/1964 | Bachli et al. | 137/414 |
| 3,194,258 | 7/1965 | Grant | 137/414 |
| 3,199,412 | 8/1965 | Palmer | 251/331 |
| 3,207,170 | 9/1965 | Fulton | 137/436 |
| 3,242,940 | 3/1966 | Sirotek | 137/218 |
| 3,285,277 | 11/1966 | Goldtrap | 137/414 |
| 3,286,977 | 11/1966 | Miottel | 251/46 |
| 3,386,462 | 6/1968 | Walters | 137/244 |
| 3,387,620 | 6/1968 | Walters | 137/414 |
| 3,387,630 | 6/1968 | Routson | 137/625.3 |
| 3,447,569 | 6/1969 | Kreuter | 138/46 |
| 3,454,036 | 7/1969 | Thompson | 137/444 |
| 3,690,344 | 9/1972 | Brumm | 251/5 |
| 3,727,623 | 4/1973 | Robbins | 137/625.3 |
| 3,760,839 | 9/1973 | Hyde | 137/414 |
| 3,771,563 | 11/1973 | Hayner | 137/625.3 |
| 3,773,063 | 11/1973 | Roosa | 137/217 |
| 4,072,164 | 2/1978 | Kaden | 137/414 |
| 4,114,642 | 9/1978 | Robbins | 137/436 |

(List continued on next page.)

*Primary Examiner*—George L. Walton
*Attorney, Agent, or Firm*—Head, Johnson & Kachigian

[57] ABSTRACT

A float operated valve for controlling the rate of flow of water from a pipe carrying water under pressure, to a vessel, comprises a pipe having an end opening of selected diameter and a flange of larger diameter surrounding the pipe. A flexible diaphragm is attached over the flange having a central closure pad adapted to cut off water flow when pressed against the pipe. A small orifice is drilled through the diaphragm so that when the flow is shut off, water can still flow through the orifice to the second side of the diaphragm. A second short pipe having a similar flange is bolted against the diaphragm to the first flange, to provide a water tight seal. There is a second small orifice in the second end of the second pipe, and a float mechanism is provided with a closure tip to close the second orifice when the water level is at a selected value. The closure tip varies the size of the second orifice so that the orifice is responsive to the float. Depending on the ratio of areas of the first and second orifices, water pressure on the second side of the diaphragm prevents flow. When the second orifice reaches a selected ares the diaphragm no longer seals the first pipe and a high flow of water is provided. A removable, resilient insert in the first pipe seats the diaphragm. The resilient insert minimizes valve maintenance while prolonging component service life. An anti-syphon relief prevents reverse fluid flow during vacuum or negative pressure conditions. The relief causes air to enter the valve to break the suction created by the vacuum or negative pressure condition while preventing water loss during normal operations.

9 Claims, 6 Drawing Sheets

U.S. PATENT DOCUMENTS

| | | | |
|---|---|---|---|
| 4,316,480 | 2/1982 | Kah, Jr. | 137/119 |
| 4,341,238 | 7/1982 | Roosa et al. | 137/414 |
| 4,352,371 | 10/1982 | Walters | 137/414 |
| 4,474,212 | 10/1984 | Schmitz | 137/625.3 |
| 4,566,484 | 1/1986 | Silverman | 137/403 |
| 4,709,721 | 12/1987 | Gish | 137/437 |
| 4,945,944 | 8/1990 | Chen | 137/403 |
| 5,082,017 | 1/1992 | Spurgeon et al. | 137/217 |
| 5,150,732 | 9/1992 | Antunez | 137/414 |
| 5,228,470 | 7/1993 | Lair et al. | 137/218 |

6,164,313

LOW-HIGH FLOW RATE VALVE

BACKGROUND OF THE INVENTION

1. Field of the Invention

The present invention relates to the field of water control valves. More particularly it concerns an improved float operated valve which permits water to trickle at a low flow rate into a tank when the water level is only slightly dropped below a selected level, but when the level is dropped more than a selected amount the valve opens farther to permit a high flow rate of water. The improved valve particularly concerns an easily serviceable, removable seat insert and an anti-syphon orifice that prevents reverse fluid flow.

2. Description of Prior Art

In the prior art as represented by my previous U.S. Pat. No. 4,298,022, entitled Energy Saver Control for Outdoor Water Heater, a float valve was utilized for opening or initiating a flow of water into an outdoor tank. Means were provided for restricting the flow into the tank, so that in cold weather, particularly, a small trickle of flow is provided to maintain a turbulent surface of the water in the tank so as to minimize freezing. Thus, as the water level was lowered in the tank, water flow was limited by appropriate means such as a needle valve, or an orifice, so as to flow at a minimum rate consistent with maintaining a clear water surface. However, if it should be desired to fill the tank rapidly, then a manual operation was required, to open the needle valve or remove the orifice, in order to get a much higher flow rate. My previous U.S. Pat. No. 4,298,022, entitled Low-High Flow Rate Valve, disclosed a valve that was adapted to supply water at either a low or high flow rate as desired. This invention was designed to provide both of these features, that is a low-rate of flow or a high-rate of flow, depending on the specific level of liquid in the tank, and this was done with one float-operated valve, whereas in my other patent, two floats and two float operated valves were required to accomplish this feat. The teachings of both of my prior patents, U.S. Pat. No. 4,298,022 and 4,352,371, are hereby expressly incorporated by reference herein.

While these systems work well for their intended function, experience has shown that maintenance operations can be difficult for these devices. In particular, the inner seat for the diaphragm was subject to tremendous stresses during use and as a result, it often required replacement prior to other portions of the diaphragm and valve. However, seat repair or replacement required removal of the entire valve and disassemble. This was an arduous, time-consuming task.

Further, in rare circumstances and under extreme operating conditions, the valves could become subject to a vacuum that caused negative flow pressure which could siphon liquids from the associated reservoir back through the valve. Naturally, this is undesirable and must necessarily be prevented.

An interesting device is shown in U.S. Pat. No. 4,566,484, wherein a liquid level controlling apparatus is described. However, no provision has been made for prevention of reverse fluid flow in this device. Further, the device would be difficult to surface since it is installed and operates under the service of the water.

U.S. Pat. No. 3,386,462 shows a differential pressure controlled system for regulating the level of liquid in a storage tank. The flow of liquid from a pressurized source is conducted to the storage tank at a regulated flow rate through a flow control valve when the inlet tank pressure is below the adjusted value. In this patent, my invention worked well for its intended purpose but it was also difficult to service and did not include an anti-syphon feature.

U.S. Pat. Nos. 3,447,569, 5,150,732, 4,316,480, 3,211,171 and 3,100,083 disclose pressure type valves of general relevance. These valves are generally directed to liquid level control and generally employ one or more diaphragms that are typically controlled by a pressure arrangement. The pressure is often supplied externally.

U.S. Pat. Nos. 3,760,839, 3,773,063, 2,986,155, 3,158,173 and 4,709,721 concern float valves associated with toilets and the like. As such, these valves are of general relevance since they tend to involve a single flow rate and are typically concerned with noise factors and the like.

U.S. Pat. Nos. 5,082,017 and 5,228,479 both describe valves with anti-siphon or back-flow prevention features. The former is designed for a toilet and comprises a valve having an imperfect seal that leaks air during vacuum conditions. The later describes a complex valve with springs and several chambers that may be installed to prevent contamination of a fluid source by insuring drainage of a sill cock.

U.S. Pat. No. 3,242,940 shows a liquid flow control valve for toilet flush tanks. The valve uses an integral nipple-like tube 9 against which diaphragm 19 seats. However, the tube 9 appears to be integrally secured to the stand pipe 22. Furthermore, the tube 9 does not appear to be narrow enough to fit within the openings provided in seating washer 7. Thus, it is not believed that tube 9 can be easily replaced in the flow control valve.

U.S. Pat. No. 2,971,525 shows a float operated valve that is interesting. The valve has a seat fitting 3 atop tube 2 against which the membrane valve seat element 21 mates when membrane 13 is depressed. The seat fitting 3 appears in FIG. 3 to be threaded and removable. However, during normal operation, the water level (as indicated by dashed line A in FIG. 1) would affect maintenance operations involving the removal of seat fitting 3. When fitting 3 is removed, the outer tube 4 apparently would rise off of shoulder 5 and become unaligned therewith. Of course, this is undesirable and would require additional diligence during maintenance operations to insure that the valve was properly reassembled. It is believed that such diligence would necessarily require additional training and/or time during maintenance. Since it is further believed that the seat fitting 3 is critical to the structural stability for the valve, removal of the fitting would inherently weaken the stability of the valve undesirably. Also, the flanges encircling seat 3 would apparently hamper access thereto. The flanges could also apparently interfere with seat sealing in some circumstances. In particular the seat must depress when seating instead of forming a seal in a natural plane.

Thus, there is a need for an easily serviceable, anti-siphon, low-high flow rate valve. An ideal device will overcome problems associated with the known art while maintaining simplistic construction.

SUMMARY OF THE INVENTION

The above referenced limitations of the known art are overcome in this invention by providing an easily serviceable anti-syphon valve controlled by a float to monitor the level of water in a vessel or tank. A pipe, through which water flows from a pressurized source into the tank has a flange surrounding the end of the pipe with an integral anti-siphon relief. A flexible diaphragm mates against a central, easily replaceable seat. The diaphragm covers the flange, and the seat at the end of the water pipe, such that when the pressure of water on the second side of the diaphragm reaches a critical value, the diaphragm presses against the seat of the pipe to shut off the flow of water. A second short pipe attached to a similar flange is clamped over the second side of the diaphragm, to the first flange, to provide a water tight seal around the periphery of the diaphragm.

A first orifice of small size is drilled through the diaphragm to permit a trickle of selected low flow rate of water through the first orifice even though the main flow of water is closed off by the diaphragm. The second pipe is terminated with a second small orifice of variable area. A float-operated arm carrying a closure tip is provided to press against the second small orifice when the level of the water reaches a selected value.

This arrangement provides a closed small value or chamber on the second side of the diaphragm, which has an entry opening of small size at the first orifice, and a second exit opening of small size, at the second orifice. When the second orifice is closed the pressure P2 in that chamber reaches the value of pressure P1 inside the pipe. Because of the larger area of the diaphragm compared to the area of the first pipe, there is a force pressing the closure portion of the diaphragm against the end of the first pipe shutting off the flow.

The two orifices in series comprise a pressure drop mechanism in which the pressure P2 in the chamber can vary between a value P1 equal to that in the first pipe, to a value of atmospheric pressure 3 or P0, when the second orifice is wide open. Of course, when the pressure P2 on the second is zero, the diaphragm is forced aside by the pressure P1 in the first pipe, and a large flow is permitted into the tank. When the area of opening of the second orifice is smaller than that of the first orifice the pressure in the second chamber is some value P2 which is intermediately between the value maximum of P2 and atmospheric pressure, P0.

Depending upon the ratio of areas of the diaphragm A1 and the area A2 of the openings the first pipe, it is clear that when the force pressing the diaphragm against the first pipe is equal to the pressure P1 in the first pipe, times the area A2 of the first pipe, flow will be cut off. Therefore, the unit pressure acting against the larger area A1 of the diaphragm can shut off the flow even though the pressure P2 is much less than P1. In fact, P2 can be quite low, which would result when the ratio of area of opening A4 of the second orifice, to the area A3 of opening of the first orifice is a selected value. Thus, when the second orifice is first opened, and is smaller than the first orifice the flow from the first pipe will be small corresponding to that through the first and second orifices. When the second orifice is opened to its widest value and the pressure in the chamber is below the critical pressure PC, then the flow goes to a high rate, depending upon the area A2 of the outlet of the first pipe.

It is clear, therefore, that by changing the area of the second orifice in response to minute changes in the water level in the tank, a low rate of flow of liquid into the tank is permitted. But when the water level has dropped to a considerably lower value, and the second orifice opens to its largest area, then the diaphragm moves away and permits the high rate of flow of water to the tank.

The invention further includes an easily serviceable removable seat that may be easily replaced when it becomes worn. As noted above, a common problem experienced with other valves involves the wear and tear upon the seat as a result of diaphragm movement during fluid control. As the diaphragm rubs against the seat, it tends to warp or otherwise degrade the seat. In addition, the fluids retained by the valve are often corrosive in nature and further accelerate the aging process. As the seat wears, it requires replacement, usually several times before the remaining components in the valve.

The invention includes a removable, resilient, preferably plastic, seat that fits inside the valve pipe and mates with the diaphragm. The removable seat fits inside the first pipe and protrudes above the bordering first flange. The removable seat is threadedly secured inside the first pipe.

During use, the diaphragm mates against the plastic insert to seal the pipe. The resilient nature of the insert permits modest deformities while retaining the seal integrity. Thus, the resilient insert minimizes valve maintenance while prolonging component service life. If formed of plastic or a similar component, the insert will also resists corrosion better than metal components. In an exemplary embodiment, the insert protrudes above the surrounding surfaces so that the diaphragm doesn't rub against these other surfaces during opening and closing. Ideally, the insert seats the diaphragm to close the first pipe when the diaphragm is relaxed. Thus, the high flow pipe is normally closed.

Ideally, the seat insert is threaded so that it may be easily serviced and/or replaced by a technician with relatively few tools. In a preferred exemplary embodiment, the insert may be easily replaced with only a conventional wire plier. As a result, little training is required for routine maintenance.

The invention further includes an anti-syphon feature or "air port" that creates an air gap and prevents reverse fluid flow during vacuum or negative pressure conditions. The "air port" is located on the discharge side of the valve and ideally is placed on the valve body just below the flange and adjacent to a discharge port. When the valve shuts off, liquid drains from the valve body through the discharge port, through the pipe attached to it, into the tank and air enters the valve body through the "air port" creating an air gap, breaking any syphon that should develop from vacuum or negative pressure conditions.

Thus, it is a primary objective of this invention to provide a float operated valve with an easily replaceable seat and which prevents syphoning and vacuum or negative pressure conditions and which operates in either of two modes. A first mode which is involved when the level of the water in the tank which is monitored by the float drops a selected small amount from the normal level, in which case a low rate of flow of water from the valve is provided. In the second mode, when the water level drops by a large amount below the selected level, the water flow then continues at a high rate of flow to bring the level back to the vicinity of the normal level at which the first mode of operation takes over.

A related object of the present invention is to provide a low-high flow rate valve wherein the internal components are resilient to reduce chaffing and friction to prolong service life.

A basic object of the present invention is to provide a valve that may be serviced by a technician with minimal training and experience.

A related object of the present invention is to provide a valve the may be serviced with relatively few tools.

An object of the present invention is to provide a valve that may be easily monitored.

Another basic object of the present invention is to provide a valve that may be quickly and efficiently serviced.

Another object of the present invention is to provide a low-high flow rate valve that prevents back-flow.

Anther object of the present invention is to provide a low-high flow rate valve that prevents source contamination with by employing an anti-siphon relief.

Yet another object of the present invention is to provide a low-high flow rate valve wherein the internal components may be easily serviced without removing the valve from its associated piping.

BRIEF DESCRIPTION OF THE DRAWINGS

These and other objects and advantages of this invention and a better understanding of the principles and details of the invention will be evident from the following description taken in conjunction with the appended drawings, in which.

DETAILED DESCRIPTION OF THE PREFERRED EMBODIMENTS

In my prior U.S. Pat. No. 4,298,022, which was entitled "Energy Saver Control for Outdoor Water Heater", a type of flow control was provided such that the rate of flow of water from a supply line into an outdoor tank of water would be controlled by a float so that it would flow into the tank at a low rate of flow, sufficiently high so that it would provide a turbulence to the surface of the water and prevent the formation of ice, thereby providing a free surface of water for the cattle to drink. This involved the use of a needle valve or a small orifice to control this rate of flow when the float valve was open.

Figure 3:
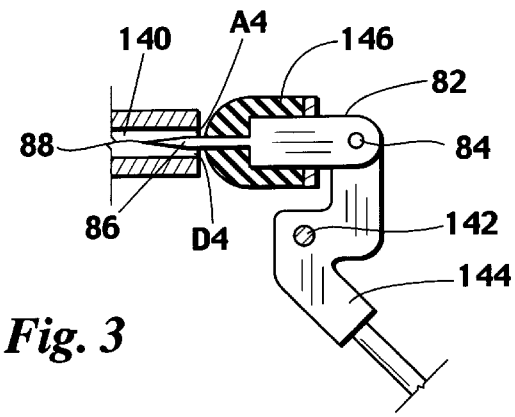
FIG. 3 illustrates an alternative design of the elastomeric closure tip.

However, under some conditions, it is desirable to have a high rate of flow such as when the level of the water in the tank is quite low. This condition would require manual attention, such as by opening the needle valve, and then later closing it to the small area that would provide the desired trickle of water. In FIG. 3 of my previous patent 4,298,022 and shown in FIG. 5 of another previous patent, U.S. Pat. No. 4,352,371, there are shown two float valve systems. One, 18A', is conventional and provides a large opening for water flow, once the water level drops below the level 14A', where the flow is no longer shut off. A second float valve system controls the level to a higher valve, 14', than the first one, but controls it with a low rate of flow of water. Thus, when a minor change in level occurs, the second float system operates and provides a desired trickle of water, and when a large level of water change occurs, both float valves open so that the large flow from the first one quickly raises the level of water in the tank and shuts itself off, and the second one then continues to control the level, at a low flow rate.

The principle object of my U.S. Pat. No. 4,298,022, was to provide a method of controlling the expenditure of electrical energy to heat that water tank. However, the fact remains that it illustrated a type of float valve system, which provides a low rate of flow, or a high rate of flow dependent upon the amount by which the normal water level in the tank is reduced. When the water level is slightly lowered the flow rate is low, and when the water level is greatly lowered, a high rate of flow takes place.

That operation was carried out in a much simplified apparatus with only a single float in my U.S. Pat. No. 4,352,371, as was shown in FIGS. 1–4 where there was shown an invention which schematically illustrates the preferred method of operation.

Figure 1:
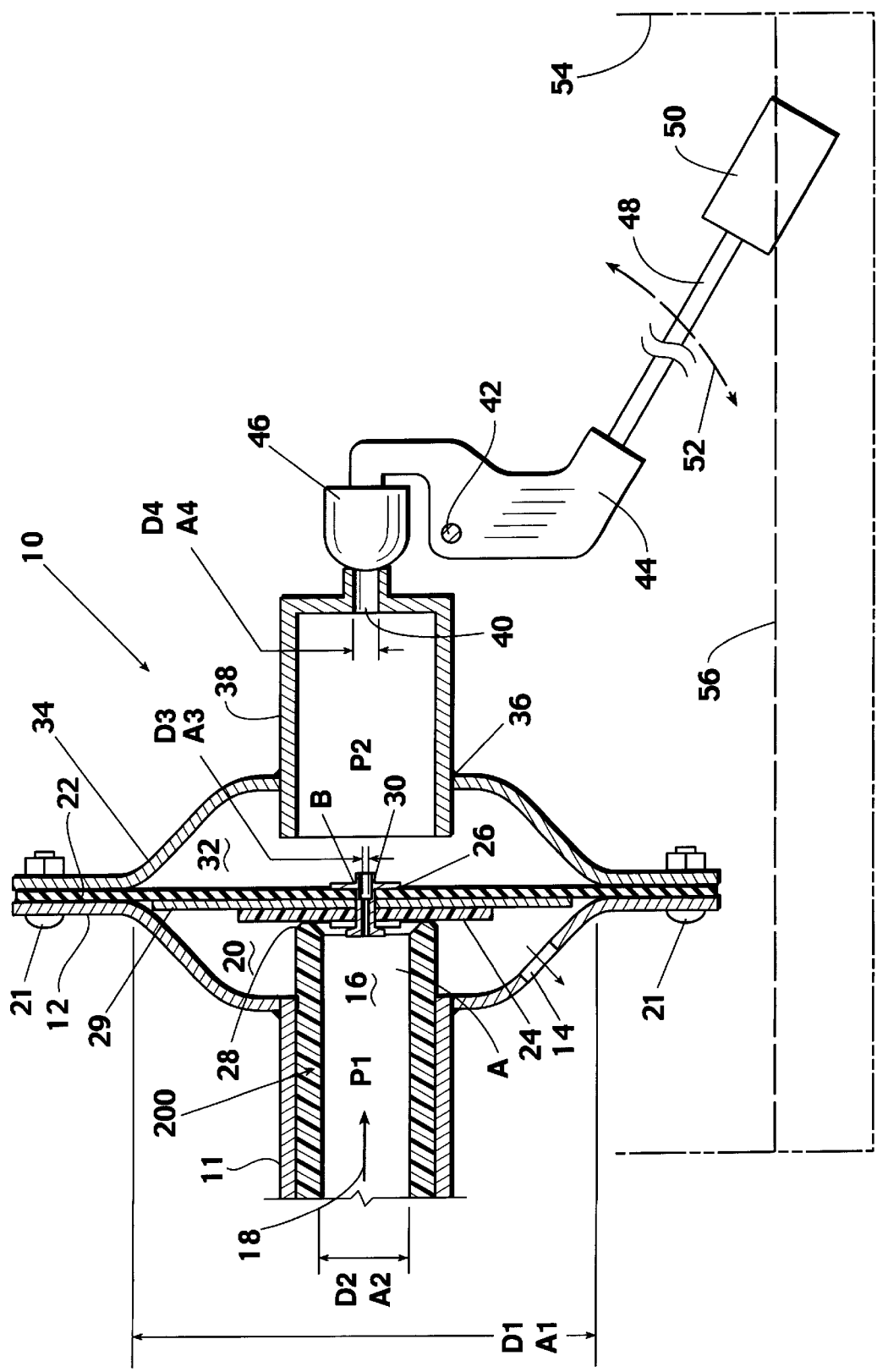
FIG. 1 is a schematic diagram illustrating the operation of the flow valve of this invention.

The present invention preferably utilizes the valve of U.S. Pat. No. 4,352,371 and provides several important improvements thereto. In an exemplary embodiment as shown in FIG. 1, the valve, generally designed by reference numeral 10, includes a supply of pressurized water (not shown) that provides a flow of water in accordance with arrow 18 into and through a inlet pipe 11 which has a terminal opening 28 of diameter D2, or area A2. This pressure in the space 16 in the first inlet pipe 11 is P1.

A circular flange 12 of considerably larger diameter D1, and corresponding area A1, surrounds the end 28 of inlet pipe 11. A flexible diaphragm 22 of the same diameter as the flange 12 is sealed against the flange 12. The flexible diaphragm carries a closure plate 24 on the side facing the inlet pipe 11, so that when a sufficient force is applied to the second side of the diaphragm in space 32, to press the closure plate 24 against the end 28 of the inlet pipe 11, the flow can be shut off. In a particular embodiment, the closure plate 24 mates with a replaceable seat 200 at the end 28. The replaceable seat is discussed in greater detail hereinafter. The closure plate 24 is supported by a reinforcing plate 29. Preferably, plate 29 is formed of metal or another rigid material and has a larger diameter than the closure plate 24. Thus, the reinforcing plate retains the closure plate in the plane established by the diaphragm 22.

A small orifice 30 is provided in the closure plate 24, reinforcing plate 29 and diaphragm 22 so that flow can go from space 16 in the inlet pipe 11 through the first orifice 30 to the second side 32 of the diaphragm. The diameter of the first orifice is D3 and the area is correspondingly A3. This first small orifice can be conveniently drilled in a rivet 26 which holds the closure plate 24 to the diaphragm 22.

Figure 4:
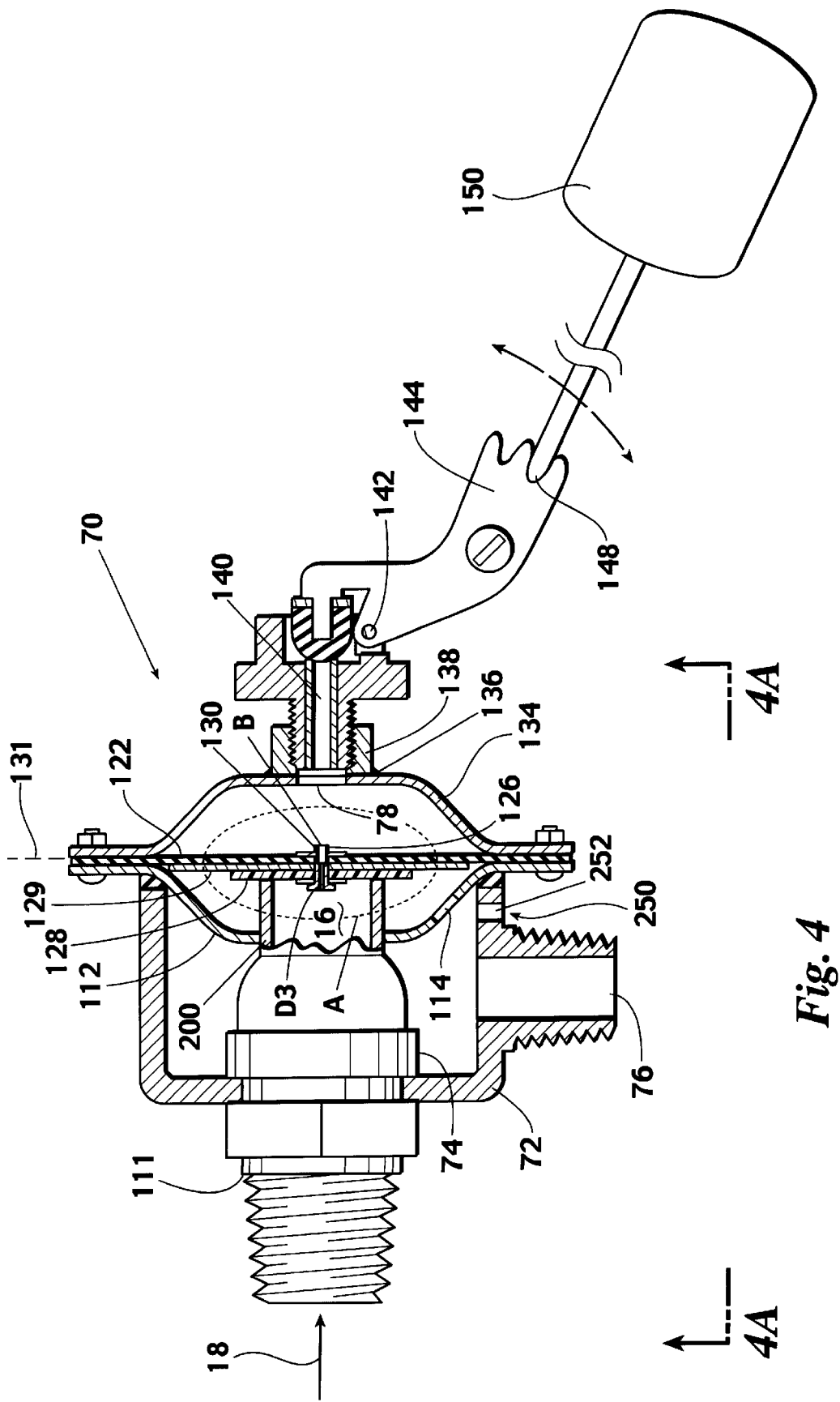
FIG. 4 illustrates in cross-section construction of the finished apparatus.
Figure 4A:
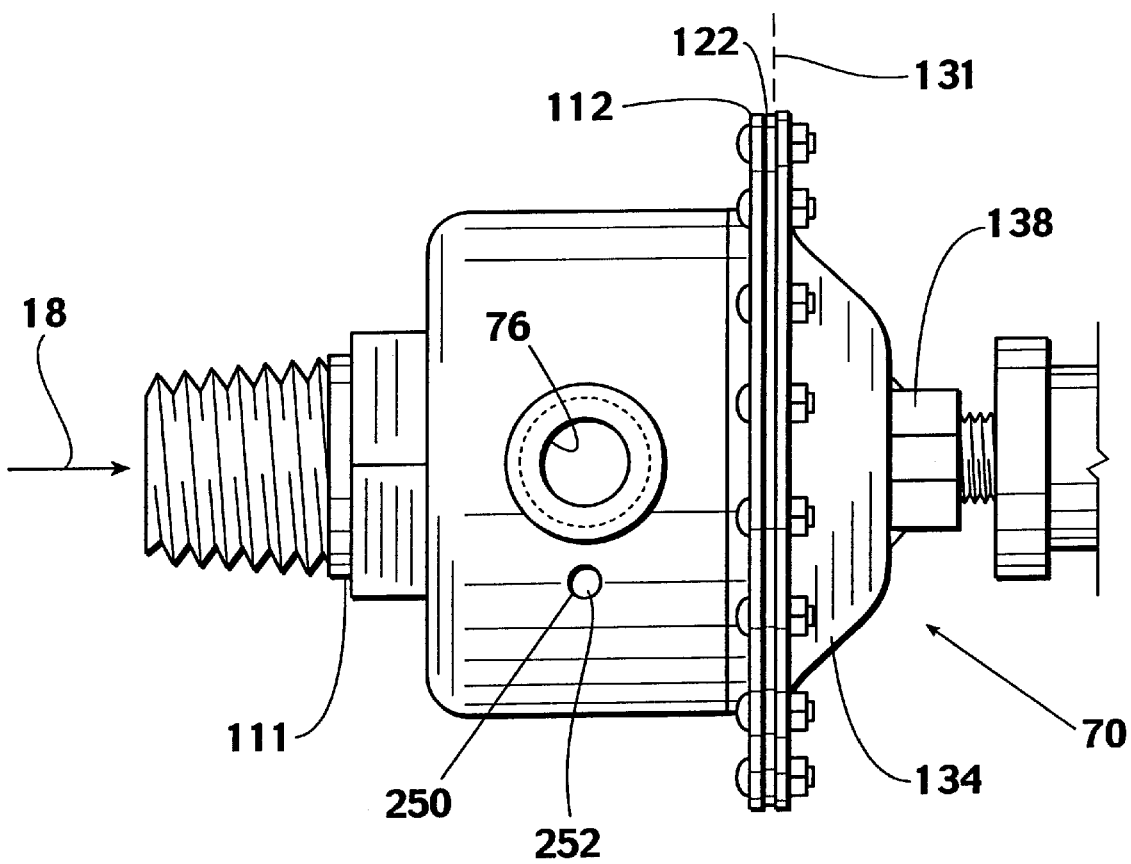
FIG. 4A is an external side view of the finished apparatus along line ZZ of FIG. 4.

A second short pipe 38 is attached to a second flange 34 of equal size to the first flange 12, which is clamped against the second side of the flexible diaphragm to the first flange by means such as screws 21, or equivalent means, so as to seal the diaphragm between the two flanges. The space between the first flange 12, and the diaphragm is indicated by numeral 20, and this space is vented to the atmosphere by at least one opening 14. Thus, when flow is not shut off from inlet pipe 11 by the closure plate 28, the flow from the inlet pipe 11 will exit through the opening 14 into the tank. The tank is shown in dashed outline by numeral 54 having a water level 56. The space or volume of the chamber on the opposite side or float side of the diaphragm 22 is indicated by numeral 32, and there is a pressure in the water in the space 32 indicated as P2. In a particular exemplary embodiment, an anti-syphon relief or air port 250 is formed next to discharge port 76 on valve body as shown in FIGS. 4 and 4A. The relief 250 prevents reverse fluid flow as is discussed in greater detail hereinafter.

A second small orifice 40 is provided on the end of the short pipe 38, which has a diameter D4 and an area A4. This is closed by means of a closure tip 46, which can be of elastomeric material, as well known in the art, and is mounted on a hinged arm 44, which rotates about a pin or axis 42. The arm 44 has a long rod 48 carrying a float member 50 which is adjusted to rest on the water level 56, and when the water level is at the proper value the float will be raised in accordance with arrow 52 and the tip 46 will be pressed against the second orifice 40 to close it off.

When the second orifice 40 is closed off, water still continues to flow through the first orifice 30 into the space 32 and will continue to flow until the pressure P2 in space 32 is equal to some value such that P2 times the area A1 of the diaphragm is equal to P1 times the area A2 of the end 28 of the inlet pipe 11. Because the area A1 is many times larger than the area A2, it is clear that a pressure in the space 32 much lower than P1 will be sufficient to provide a closure force against the end 28, equal to that due to the pressure P1 in the first inlet pipe 11 over the area A2.

Figure 2:
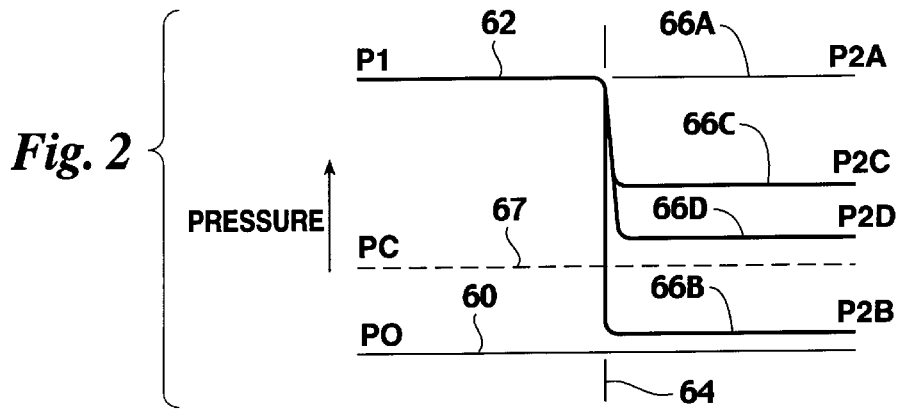
FIG. 2 illustrates schematically the pressure relations in the space 16 within the supply pipe, and in the space on the second side 32 of the diaphragm.

This is illustrated in FIG. 2 where there is shown a graph having a zero pressure P0 which will be atmospheric pressure numeral 60, ordinate represents pressure. There will be a line 62 representing the pressure P1 in the inlet pipe 11. Assume that the ratio of area A1 to area A2 is some figure, which, for example, could be 10. Then, when there is a pressure P2 greater than P1 divided by 10, such as P2D, represented by line 66D, the force holding the diaphragm against the end of the inlet pipe 11 is still higher than the force tending to open inlet pipe 11. There is a selected critical value of pressure, PC, where there is a balance of forces on the diaphragm. If the pressure P2 is greater than PC, high flow rate is cut off. If P2 is less than PC, high flow continues.

Thus, the pressure in space 32 can be reduced, such as when the level 56 drops a small amount, the float will drop, and the area of the second orifice 40 opens a small amount, and is for example, equal to that of the first orifice 30. This is represented by the line 66C, corresponding to a pressure P2C.

When the float level drips down further, the second orifice 40 is fully open, if the area A4 of the second orifice is now larger than the first orifice area A3, the pressure in space 32 will drop to a value P2B, represented by line 66B, which is below the critical pressure PC shown by the dashed line 67. In that case, there is not sufficient force holding the diaphragm against the opening 28 of the pipe 11, and the pressure P1 then forces a large rate of flow out of the opening 28, and out of the opening 14, into the tank 54. This will quickly bring the level of water 56 up to a point where the second orifice 40 starts to close and the pressure then builds up in space 32 to a value higher than PC causing diaphragm 22 with closure plate 24 to seal shut, the beveled end of removable seat 200 stopping the flow. pressure then builds up in space 32 to a value higher than PC, and the diaphragm then closes off flow through the inlet pipe 11.

FIG. 3 shows an alternative preferred embodiment of a type of closure for the opening 40, which is closed by the closure tip 146. The closure tip 146 can be of elastomeric material such as rubber or other compliant sealing material, and is supported by a short arm 82, which has an extension in the form of a needle 86 which tapers from a large diameter down to a very small diameter 88. The arm 82 is hinged at pin 84, to the control arm 144, which rotates about the shaft 142, and carries a rod 48 and float 50, as shown in FIG. 1.

When the tip 146 is placed tightly against the end of the opening 140 the opening will be closed. As the tip 146 moves away, the opening 140 will be in the form of an annular space between the needle 86, and the opening 140. If this area A4 is small, of the order of that of the first orifice A3 then as previously mentioned there will be a drop of pressure in the space 32 but it will be at some level higher than PC of FIG. 2 and the diaphragm will remain closed against the inlet pipe 11. As the level 56 in the tank drops slightly more than arm 82 moves out farther, and because of the taper of the needle 86 the annular area becomes larger and the pressure P2 drops more, until the annular area A4 becomes large compared to the area A3 of the first orifice. The pressure P2 then equals, or is less than the critical pressure PC, and the diaphragm moves away from the inlet pipe 11, permitting a high flow rate of water.

It is clear therefore that with a type of flow control illustrated in FIG. 3 with the apparatus of FIG. 1 the flow from the inlet pipe 11 can be at a slow trickle rate through the first and second orifice when the water level 56 drops only slightly, but will be at a high rate of flow when the water level drops to a value considerably lower than the level 56.

FIG. 4 shows an exemplary construction of the preferred embodiment. In the exemplary construction, the valve is generally designated by reference numeral 70. Valve 70 includes a threaded pipe 111 that is adapted to be inserted into a water supply pipe (not shown). The valve 70 shown in FIG. 4 is similar to the valve 10 shown in FIG. 1 in several respects.

Valve 70 comprises an internal pipe section 74 that mates with a first flange 112. Flange 112 has a plurality of spaced apart openings 114 that permit the flow of water therethrough. Preferably valve 70 includes an external shell 72 penetrated by at least one flow channel 76. Thus, fluids flowing through openings 114 into the valve shell 72 will subsequently exit shell 72 through flow through channel 76 to the valve exterior and into an adjacent reservoir.

A flexible diaphragm 122 supports a closure plate 128 and a reinforcement plate 129. Ideally, the closure plate 128 and reinforcement plate 129 are secured by a central rivet 126. Rivet 126 has a small orifice 130 penetrating its core. A second short pipe 138 attaches adjacent an opening 78 adjacent end 136 in second flange 134.

As shown in FIG. 4A, air port 250 comprises a small orifice 252 drilled in external shell 72. Ideally, the orifice 252 has a diameter between 1/10 and 1/18 of an inch. This diameter is sufficient to permit restricted airflow to break any vacuum that may develop as a result of negative pressure in supply inlet pipe 111.

Figure 5:
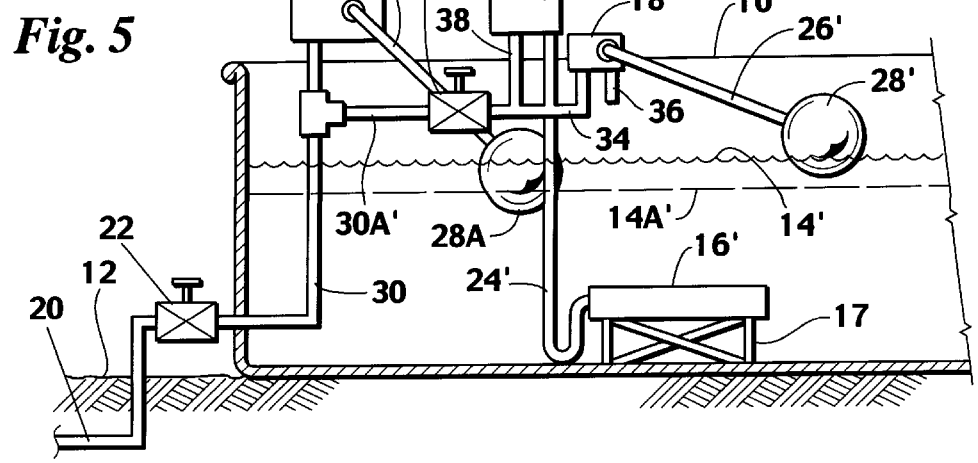
FIG. 5 illustrates a combination of two float valves, one controlling the rate of water flow into the tank at a small rate of flow, and the other controlling the water flow into the tank at a high rate of flow.

FIG. 5 shows a tank 10' resting upon the earth 12 and having a water level at the indicated level of 14'. The water line 20 is provided with a shut off valve 22 of conventional type, and a riser pipe 30 supporting a conventional float type water level control system 18A'. This receives line pressure water through the pipe 30 and is controlled by the arm 26A' carrying the float 28A, which assumes a level corresponding to a depressed level 14A' below the desired level 14' prime. It is clear that with the level at 14A' and with a conventional float control valve, water would flow into the tank from the control 18A' to bring the level quickly up to the level 14'.

The pressure line 30 has a T and a second line 30A' which has a flow rate control valve 32' such as a needle valve, or an orifice, as directed in Ser. No. 128,466, now U.S. Pat. No.

4,298,022. This supports a second float control valve 18' with an arm 26' and float 28' which is adjusted to be sensitive to the desired level of water surface 14'. Water flows into this control valve 18' through line 34 at the level rate set by the control 32'. When the level 14' drops and float 28' drops, 18' then opens and allows the flow through pipe 36 at the low rate of flow through the control 32'.

It is clear therefore that with two sets of float controlled valves 18' and 18A' that one can provide flow at a small rate of flow corresponding to the control 32' while the other is sensitive to a lower level of water in the tank and provide flow at a high rate, which is not restricted corresponding to that through the pipe 30. Thus, the system of FIG. 5 represents one embodiment of a high-low flow rate float control valve system.

It is clear however that as shown in FIG. 1 the apparatus there described will do the equivalent of the two float control systems 18' and 18A' of FIG. 5, and the much simplified apparatus of FIGS. 1 and 4 will provide an equal result.

While I have described this invention in FIG. 1 in terms of a water level control system for use in outdoor tanks as covered in my previous U.S. Pat. Nos. 4,298,022 and 4,352,371 this high-low flow rate water level control system, can be used in any type of application where a fine control of water level is required for small variations in level, but a high rate of flow is required for a large drop in level. Thus this invention should not be limited to the application illustrated in FIG. 5 which is only one of many possible applications.

Also, while I have shown the closure means in FIG. 3 as a combination of an elastomeric pad 146 plus a needle valve 86, it could be a needle valve alone. Also the single second small orifice and the third small orifice can be connected in parallel, which would be subsequently closed by the closure tip 46.

Figure 6:
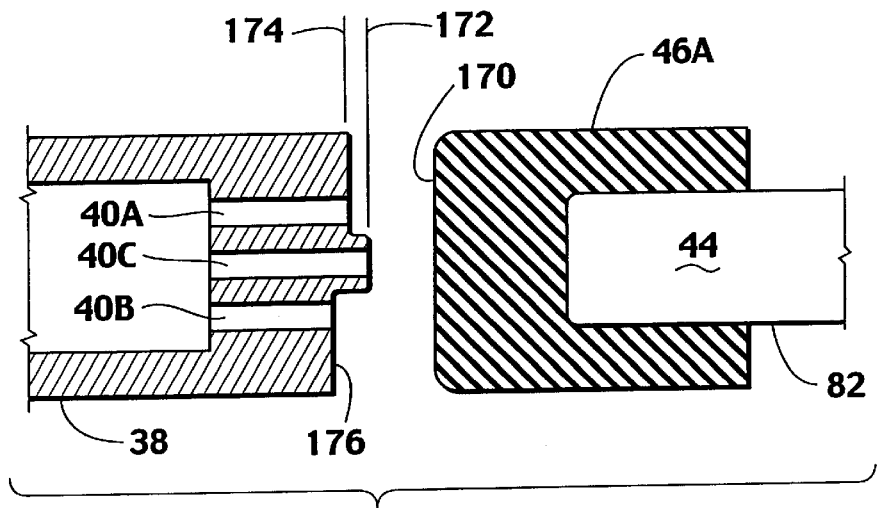
FIGS. 6 and 7 illustrate the use of a plurality of second small orifices in parallel.

Referring now tho FIG. 6 there is shown another embodiment of the second small orifice C of FIG. 1. However, instead of a single small orifice there are shown three smaller parallel orifices 40, 40A and 40B, which are of a total cross-sectional area about equal to that of 40 of FIG. 1. Also, the three orifices are of slightly different lengths as shown. Also, the closure member 46B, unlike 46, is flat across the closure surface instead of being hemispherical. Thus, when the float rises the face 170 of 46A is moved to the left and first closes 40C, then 40A and then 40B as it continues to move to the left. Thus the second small orifice 40 has an area which varies with the level of the float, and thus with the position of the closure 46A. Of course, the closure 46A must be compressible enough that it can simultaneously close all three openings. Such materials are well known in the art.

Figure 7:
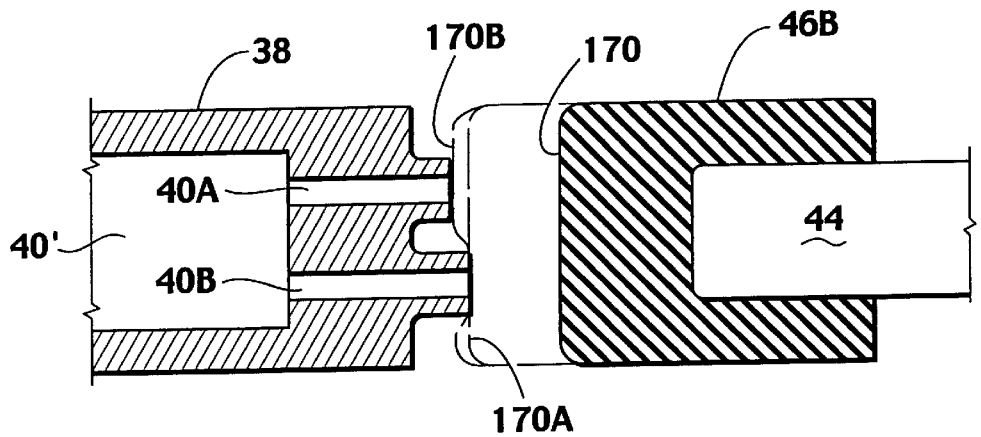

FIG. 7 is similar except that the orifices 40A and 40B comprise small tubes which project beyond the end of 38. The figure shows successive positions 170A and 170B of the closure surface 170 of 46B as the level of water rises.

Figure 8:
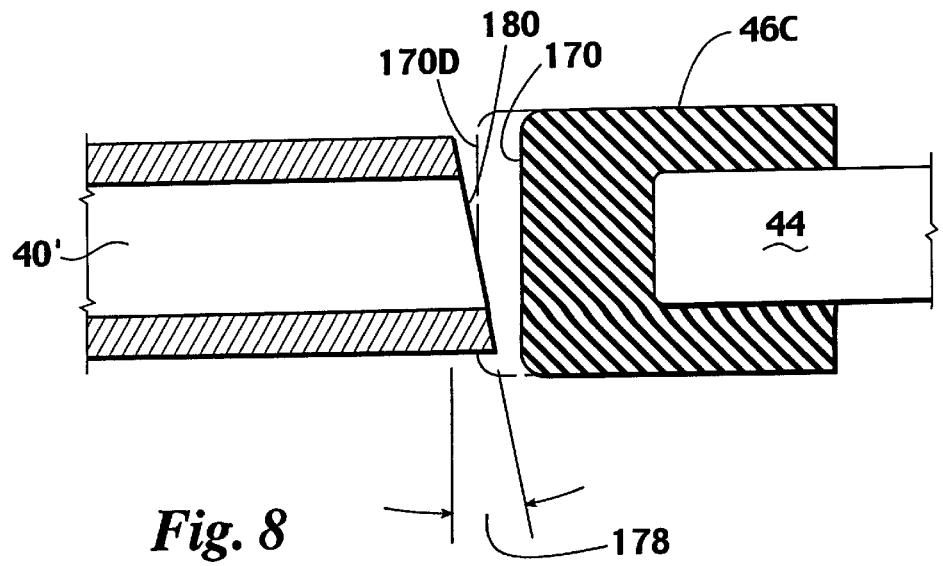
FIG. 8 illustrates another embodiment of a second small orifice.

FIG. 8 illustrates another embodiment of the second small orifice C of FIG. 1. Here again a float closure face of closure 46C is used. There is only a single small orifice 40; but the end face 180 is cut at a selected angle 178 to the plane perpendicular to the axis of 40'. The drawing shows 170D at an intermediate position of the contacting face 170, where it has reduced the cross-sectional area of the opening 40'.

Figure 9:
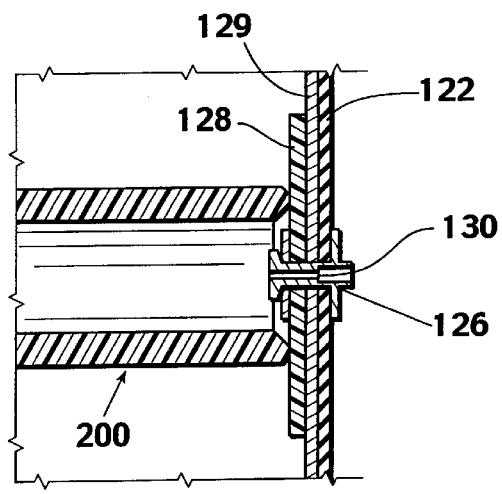
FIG. 9 is an enlarged, cross-sectional view of the encircled portion of FIG. 4, showing the diaphragm mated against the removable seat; and, FIG. 10 is a partially fragmented, partially exploded isometric view taken from FIGS. 1 and 4, showing the insert removed from the valve and adjacent the diaphragm to show their alignment during mating.
Figure 10:
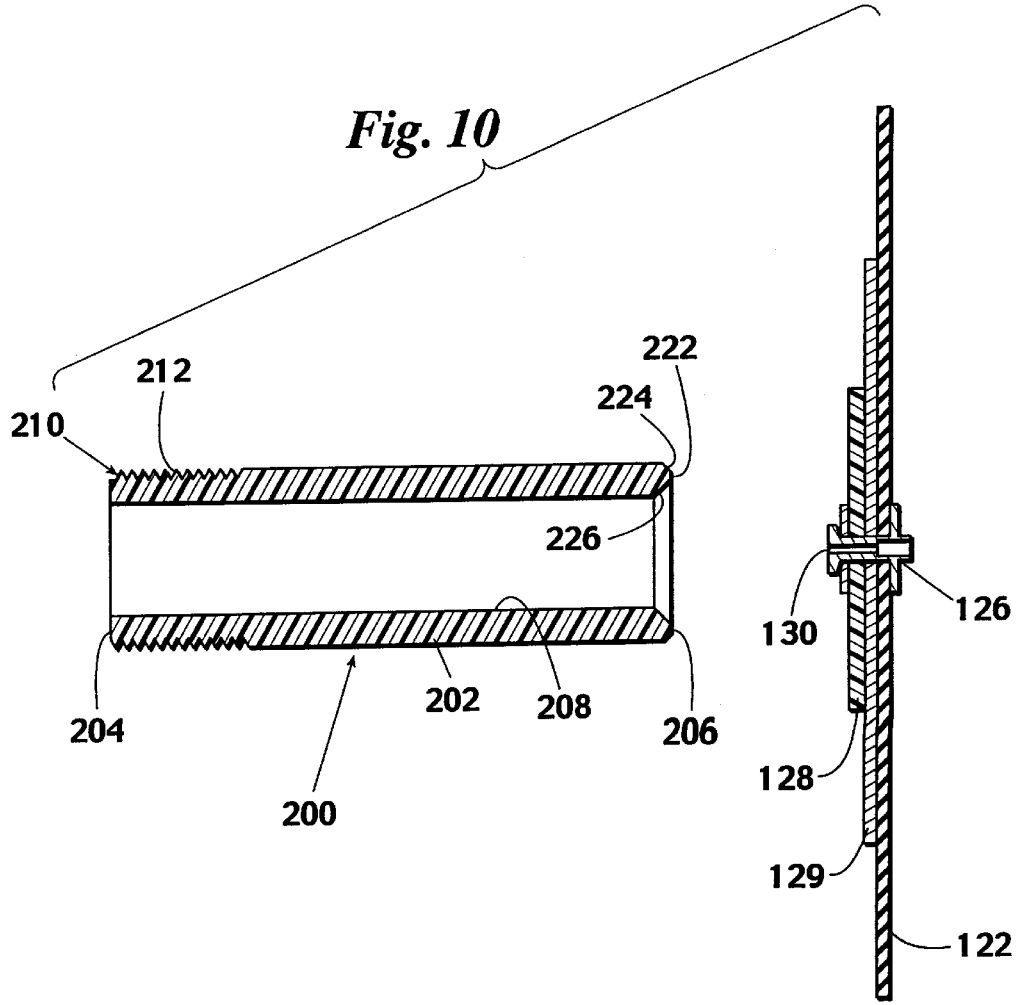

The seat 200 includes a removable, elongated, resilient tubular body 202 with spaced apart ends 204 and 206 (FIGS. 9–10). An internal flow channel 208 extends between ends 204 and 206. In use, channel 208 permits fluid flow through seat 200 and selectively into flange 112.

In a particular embodiment, end 204 further includes an integral coupling 210. Coupling 210 includes a threaded section 212 adapted to engage a corresponding threaded receptor inside pipe 11 (not shown).

End 206 preferably includes a beveled seat 220 that protrudes substantially above the interior of flange 112. Seat 220 defines a resilient terminus 222 with beveled external sidewalls 224. Corresponding internal beveled sidewalls 226 complement external sidewalls 224 to form terminus 222. Ideally terminus 222 protrudes at least ½" above the interior of flange 112.

Coupling 210 permits the efficient installation of seat 200 inside inlet pipe 11. Thus, a technician may easily replace insert 200 when necessary. The tools required for replacement are few, typically only a conventional wire plier or the like is required. During insert replacement, the technician simply grasps the terminus of seat 200 that protrudes above flange 112 and twists appropriately to remove the insert 200. The technician then installs a replacement seat 200 by aligning end 204 adjacent the interior threads 111 and twist appropriately to install seat 200.

During use, seat 200 provides a beveled terminus end 222 that mates with closure plate 128. Ideally, closure plate 128 is supported by reinforcement plate 129 on diaphragm 122. A central rivet 126 with a small centrally located orifice 130 secures the closure plate 128 and reinforcing plate 129 to diaphragm 122. Closure plate 128 preferably aligns with the seat 200 to close the flow channel 208 adjacent end 206. Ideally, the plate 128 seats against terminus 222 when the diaphragm 122 is in its relaxed, normally closed position. In other words, when the diaphragm 122 is in a relaxed state, the seat 220 is mated to closure plate 128. In this manner, the default condition for the valve is in the closed position to prevent wasteful fluid flow. Also, this alignment permits proper operation to be easily monitored by the technician.

When monitoring the valve, the technician may actuate valve 70 by removing a sufficient amount of fluid to drop the fluid level 56 beneath the float 50. The technician may then simply monitor the valve for a complete cycle to determine its condition. Also, the technician may casually monitor the valve 70 by listening for running water to determine when the system is operating properly.

The plane established by the longitudinal axis 131 of diaphragm 122 is preferably perpendicular to the plane defined by the terminus 222 during normal closed conditions. In this manner, the valve normally defaults to the closed position. In other words, water pressure is required to move the diaphragm 122 out of its aligned condition or natural position (in the plane established by the longitudinal axis 131).

Seat 200 is preferably molded from a thermoplastic resin that has a resilient nature. Thus, the seat 200 may be slightly deformed without permanent injury to its structure. This is useful during installation in that the insert may be firmly anchored without harming its sealing capabilities. This resilient nature also helps preserve the closure plate 128 and terminus 222 for longer periods of time then the previous metal seat by reducing chaffing and friction during opening and closing. Also, the replaceable nature of the insert makes maintenance and servicing the valve more convenient and efficient.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

Whereas, the present invention has been described in relation to the drawings attached hereto, it should be understood that other and further modifications, apart from those shown or suggested herein, may be made within the spirit and scope of this invention.

What is claimed:

1. A float-operated valve for controlling the flow of a liquid under pressure to a vessel, comprising:

an inlet conduit carrying said liquid terminating in a first flange of selected diameter D1;

an elongated tubular elastomeric insert replaceably received within said inlet conduit through which said liquid flows and having a liquid outlet end forming a contoured liquid outlet seat, the liquid outlet seat having a diameter D2, where D1 is large compared to D2;

an external shell surrounding a rearward surface of said first flange, the external shell having a flow channel extending therefrom by which liquid is carried out of the external shell and the external shell having a small diameter vent opening of about $1/10$ to $1/18$ of an inch, the vent opening being spaced from said flow channel, the vent opening being constantly open to the interior of the vessel to permit air therefrom to enter said external shell to alleviate a vacuum condition therein and to thereby prevent liquid from being siphoned into said external shell through said flow channel;

a flexible diaphragm adapted to be clamped over said flange, said diaphragm comprising an elastomeric closure plate normally disposed against said seat to close off flow through said conduit;

a first small orifice of selected diameter D3 though the center of said diaphragm and having an area A3, where D3 is small compared to D2;

a second flange clamped over said diaphragm to said first flange, enclosing said diaphragm thereby defining a pressurized and liquid tight chamber therebetween, liquid from said inlet conduit entering said pressurized chamber through said first small orifice, said second flange having an opening, and attached over A opening is a first end of a short second pipe;

a second small orifice of area A4 closing off a second end of said short second pipe, where A4 is larger than A3; and a float-operated closure means for varying the area of said second small orifice as a function of liquid level in said vessel, for maintaining or relieving the liquid within said pressurized chamber and in which said second small orifice comprises at least two smaller orifices in parallel, a first of which terminates outwardly farther than at least a second of the orifices being sequentially closed or opened by said closure means as it moves in response to the liquid level for closing or opening said closure plate to shut off or open flow communication between the inlet conduit and said liquid outlet seat to the vessel.

2. The apparatus as in claim 1 in which the area of said diaphragm of diameter D1 is A1, and the area of said first opening of diameter D2 is A2.

3. The apparatus as in claim 2 in which the ratio A1/A2 is at least 5.

4. The apparatus as in claim 2 in which the ratio A1/A2 is at least 10.

5. The apparatus as in claim 1 in which said second small orifice comprises at least two smaller orifices in parallel, which would be sequentially closed by said closure means.

6. The apparatus as in claim 1 in which said second small orifice is in a transverse end wall, the outer surface of which comprises at least two parts one of which extends outwardly farther than the other with at least two smaller orifices drilled through said wall, one in each part.

7. The apparatus as in claim 1 in which said second small orifice is a tube of selected small diameter with its outer end cut in a plane at a selected small angle to a plane perpendicular to the axis of said tube.

8. The valve as described in claim 1 wherein said diaphragm further comprises a rigid reinforcing plate adjacent said closure plate, said reinforcing plate having a larger diameter than said closure plate and adapted to retain said closure plate in a plane substantially parallel to the plane established by the diaphragm.

9. A low-high, float-operated valve for controlling the flow of a liquid from a conduit carrying said liquid to a vessel, comprising;

an inlet conduit carrying said liquid;

an elongated tubular easily replaceable elastomeric insert received within said inlet conduit through which said liquid flows and having a contoured liquid outlet end;

a first flange secured to said inlet conduit defining an interior adjacent to and encompassing said liquid outlet end of said insert;

a beveled contoured seat forming on said liquid outlet end of said it, said beveled seat protruding substantially into said first flange interior;

a flexible diaphragm secured to a forward face of said first flange to form a flexible boundary of said interior, said diaphragm comprising an elastomeric closure plate backed by a rigid reinforcing plate, both secured to said diaphragm by a central rivet with a small orifice therethrough, said closure plate adapted to mate with said beveled seat formed on said liquid outlet end of said elongated tubular elastomeric insert when said diaphragm is normally disposed, an external shell surrounding a reward surface of said first flange, the external shell having a flow channel extending therefrom by which liquid is carried out of the external shell and the external shell having a small diameter vent opening of about $1/10$ to $1/18$ of an inch, the vent opening being spaced from said flow channel, the vent opening being constantly open to the interior of the vessel to permit air therefrom to enter said external shell to alleviate a vacuum condition therein and to thereby prevent liquid from being siphoned into said external shell through said flow channel;

a second flange clamped over said diaphragm to said first flange, enclosing said diaphragm, thereby defining a pressurized and liquid tight chamber therebetween, the liquid from said inlet conduit entering said pressurize chamber through said first small orifice, said second flange having an opening to which a first end of a short second pipe is secured;

a second small orifice closing off a second end of said short second pipe; and a float-operating closure means for varying the area of said second small orifice as a function of liquid level in said vessel for maintaining or relieving the liquid within said pressurized chamber in response to the liquid level for closing or opening said closure plate to shut off or open flow communication between said inlet conduit liquid outlet seat to the vessel.

* * * * *